(12) United States Patent
Morimura et al.

(10) Patent No.: US 11,188,797 B2
(45) Date of Patent: Nov. 30, 2021

(54) IMPLEMENTING ARTIFICIAL INTELLIGENCE AGENTS TO PERFORM MACHINE LEARNING TASKS USING PREDICTIVE ANALYTICS TO LEVERAGE ENSEMBLE POLICIES FOR MAXIMIZING LONG-TERM RETURNS

(71) Applicant: INTERNATIONAL BUSINESS MACHINES CORPORATION, Armonk, NY (US)

(72) Inventors: Tetsuro Morimura, Tokyo (JP); Hiroki Yanagisawa, Tokyo (JP); Toshiro Takase, Chiba-ken (JP); Akira Koseki, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 16/175,048

(22) Filed: Oct. 30, 2018

(65) Prior Publication Data
US 2020/0134390 A1 Apr. 30, 2020

(51) Int. Cl.
*G06K 9/62* (2006.01)
*G06N 20/00* (2019.01)

(52) U.S. Cl.
CPC ......... *G06K 9/6264* (2013.01); *G06K 9/6257* (2013.01); *G06K 9/6265* (2013.01); *G06N 20/00* (2019.01)

(58) Field of Classification Search
CPC .... G06N 20/00; G06K 9/6257; G06K 9/6265; G06K 9/6264
See application file for complete search history.

(56) References Cited

U.S. PATENT DOCUMENTS

| | | | |
|---|---|---|---|
| 8,793,211 B2 | 7/2014 | Marecki et al. | |
| 10,402,733 B1* | 9/2019 | Li | G06N 7/005 |
| 2003/0176931 A1* | 9/2003 | Pednault | G06N 20/00 |
| | | | 700/31 |

(Continued)

OTHER PUBLICATIONS

Duell et al. ("Ensembles for Continuous Actions in Reinforcement Learning"; ESANN 2013 proceedings, European Symposium on Artificial Neural Networks, Computational Intelligence and Machine Learning; pp. 1-6;URL:https://pdfs.semanticscholar.org/f617/db6887b25c5979775909c27d14dc09716377.pdf) (Year: 2013).*

(Continued)

*Primary Examiner* — Peet Dhillon
(74) *Attorney, Agent, or Firm* — Tutunjian & Bitetto, P.C.; Randall Bluestone (57) ABSTRACT

A method for implementing artificial intelligence agents to perform machine learning tasks using predictive analytics to leverage ensemble policies for maximizing long-term returns includes obtaining a set of inputs including a set of ensemble policies and a meta-policy parameter, selecting an action for execution within the system environment using a meta-policy function determined based in part on the set of ensemble policies and the meta-policy function parameter, causing the artificial intelligence agent to execute the selected action within the system environment, and updating the meta-policy function parameter based on the execution of the selected action.

17 Claims, 4 Drawing Sheets

(56) References Cited

U.S. PATENT DOCUMENTS

| | | | | |
|---|---|---|---|---|
| 2004/0015459 | A1* | 1/2004 | Jaeger | G06N 3/08 706/15 |
| 2007/0033034 | A1* | 2/2007 | Yao | G10L 15/20 704/244 |
| 2014/0358077 | A1* | 12/2014 | Oruklu | A61M 5/365 604/111 |
| 2015/0332165 | A1* | 11/2015 | Mermoud | G06N 20/00 706/12 |
| 2016/0283970 | A1 | 9/2016 | Ghavamzadeh et al. | |
| 2017/0032245 | A1* | 2/2017 | Osband | G06N 3/08 |
| 2017/0131174 | A1* | 5/2017 | Enev | E03B 7/071 |
| 2018/0075362 | A1* | 3/2018 | Moreira-Matias | G06N 3/084 |
| 2018/0151177 | A1* | 5/2018 | Gemmeke | G10L 15/065 |
| 2018/0165603 | A1* | 6/2018 | Van Seijen | G06N 3/084 |
| 2019/0318648 | A1* | 10/2019 | Zhang | G09B 19/06 |
| 2019/0371348 | A1* | 12/2019 | Shahbazi Mirzahasanloo | H04W 84/12 |

OTHER PUBLICATIONS

Baxter, "Infinite-Horizon Policy-Gradient Estimation", Journal of Artificial Intelligence Research, vol. 15, Jul. 2001, pp. 319-350.

Cesa-Bianchi, "Prediction, Learning, and Games", Cambridge University Press, Mar. 2006, 403 pages.

Osband, "Deep Exploration via Bootstrapped DQN", Advances in Neural Information Processing Systems 29, Feb. 2016, 18 pages.

Doshi-Velez, "The Infinite Partially Observable Markov Decision Process", Advances in Neural Information Processing Systems 22, Dec. 2009, pp. 477-485.

Faußer, "Ensemble Methods for Reinforcement Learning with Function Approximation", Proceedings of the 10th International Conference on Multiple Classifier Systems, Jul. 2011, pp. 56-65.

Grondman, "A Survey of Actor-Critic Reinforcement Learning: Standard and Natural Policy Gradients", IEEE Transactions on Systems, Man, and Cybernetics, Part C: Applications and Reviews, Nov. 2012, pp. 1291-1307.

Wiering, "Ensemble Algorithms in Reinforcement Learning", IEEE Transactions on Systems, Man, and Cybernetics, Part B, vol. 38, Issue 4, Aug. 2008, pp. 930-936.

* cited by examiner

IMPLEMENTING ARTIFICIAL INTELLIGENCE AGENTS TO PERFORM MACHINE LEARNING TASKS USING PREDICTIVE ANALYTICS TO LEVERAGE ENSEMBLE POLICIES FOR MAXIMIZING LONG-TERM RETURNS

BACKGROUND

Technical Field

The present invention generally relates to artificial intelligence and machine learning, and more particularly to implementing artificial intelligence agents to perform machine learning tasks using predictive analytics to leverage ensemble policies for maximizing long-term returns.

Description of the Related Art

Decision process models can be used to study a wide range of optimizations problems that can be solved using machine learning. One example of a machine learning task is a reinforcement learning task. The goal of reinforcement learning is to train an artificial intelligence agent to select reward maximizing or cost minimizing actions by associating actions with rewards or costs.

SUMMARY

In accordance with an embodiment of the present invention, a system for implementing artificial intelligence agents to perform machine learning tasks using predictive analytics to leverage ensemble policies for maximizing long-term returns is provided. The system includes an artificial intelligence agent, a memory device for storing program code and at least one processor device operatively coupled to the memory device. The at least one processor device is configured to execute program code stored on the memory device to obtain a set of inputs including a set of ensemble policies and a meta-policy parameter, select an action for execution within the system environment using a meta-policy function determined based in part on the set of ensemble policies and the meta-policy function parameter, cause the artificial intelligence agent to execute the selected action within the system environment, and update the meta-policy function parameter based on the execution of the selected action.

In accordance with another embodiment of the present invention, a computer-implemented method for implementing artificial intelligence agents to perform machine learning tasks using predictive analytics to leverage ensemble policies for maximizing long-term returns is provided. The method includes obtaining a set of inputs including a set of ensemble policies and a meta-policy parameter, selecting an action for execution within the system environment using a meta-policy function determined based in part on the set of ensemble policies and the meta-policy function parameter, causing the artificial intelligence agent to execute the selected action within the system environment, and updating the meta-policy function parameter based on the execution of the selected action.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Markov decision process (MDP) models are used to model decision making processes in situations where outcomes are a combination of random and under the control of a decision maker. MDP models can be used to study a wide range of optimizations problems that can be solved using machine learning (e.g., reinforcement learning). The goal of reinforcement learning using MDP models is to train an artificial intelligence agent to select reward maximizing or cost minimizing actions taken from one state to another state in its environment.

Machine learning tasks (e.g., reinforcement learning tasks) can use partially observable Markov decision process (POMDP) models. POMDP models can be used to model decision making processes (e.g., reinforcement learning processes) where it is assumed that system dynamics are determined by an MDP, but the underlying state cannot be directly observed. Instead, a POMDP model maintains a probability distribution over all possible states based on a set of observations and observation probabilities and the underlying MDP. POMDPs are often computationally intractable to solve, so solutions for POMPDs can be approximated or estimated utilizing computer-implemented methods.

A policy refers to a function that describes how to select actions in each state (e.g., belief), and can be used to maximize a total discounted reward in a POMDP model. That is, a policy is a mapping from a state to an action. In real-world problems where parameters can be unknown, model parameters used to discover a POMDP policy need to be learned from data by using one or more statistical models. The one or more statistical models can include a non-parametric model such as, e.g., an infinite Hidden Markov Model (iHMM). An iHMM is a model for time-series data that extends HMMs with an infinite number of hidden states. However, the representation of states in a POMDP policy search can be redundant when the model parameters, including the number of states, are estimated based on non-parametric models (e.g., iHMMs).

In the case that a few existing systems are consolidated, there can be multiple policies (e.g., rule-engines). Instead of selecting a single policy, it is often the case that all policies are used for maximizing the return. For example, dialog engines for young people and senior citizens can be combined to create a dialog engine for people having ages between the young people and the senior citizens. As another example, auto-trading engines can be mingled between a plurality of companies to build an effective auto-trading policy. Furthermore, when a system dynamics model (e.g., as MDP/POMDP) is estimated from data with a Bayesian approach (e.g., Markov chain Monte Carlo (MCMC)), many system models can be sampled. Therefore, since a policy can be computed from each system model, many policies can be obtained.

The embodiments described herein can leverage ensemble policies related to a machine learning task for maximizing long-term returns. The embodiments described herein can parametrize a meta-policy that selects an action from information associated with the ensemble policies, and update the parameter(s) of the meta-policy for improving the expected cumulative reward. The embodiments described herein can dynamically learn a rule of using different existing policies depending on the situation, as opposed to relying on a set or stationary rule. The existing policies can be learned in different domains. Learning policies related to machine learning tasks from scratch generally requires much more data. Accordingly, the selection of policies from a set of ensemble policies in accordance with the embodiments described herein decreases the amount of storage resources and/or computational resources required for selecting policies related to a machine learning task.

The embodiments described herein can be applied to a wide variety of real-world machine learning tasks (e.g., reinforcement learning tasks) to improve the performance of the machine learning tasks by artificial intelligence agents (e.g., robots). Examples of such machine learning tasks include, but are not limited to, dialog control, structural inspection, elevator control, active vision, robotic decision-making processes (e.g., robotic navigation), machine maintenance, patient management, collision avoidance, spoken dialogue systems, planning under uncertainty, etc.

Figure 1:
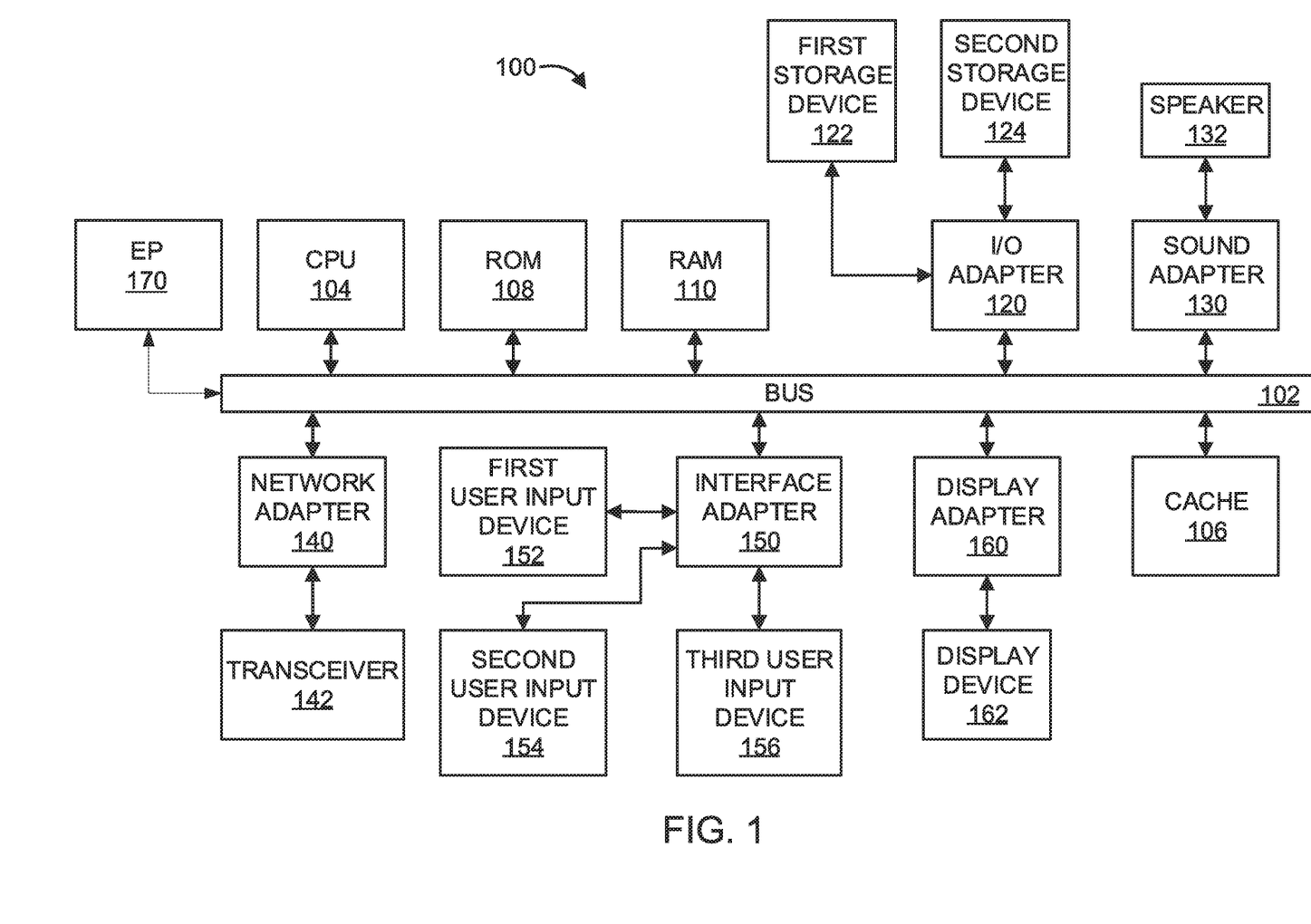
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Ensemble policy (EP) component 170 may be operatively coupled to system bus 102. EP component 170 is configured to perform one or more of the operations described below. EP component 170 can be implemented as a standalone special purpose hardware device, or may be implemented as software stored on a storage device. In the embodiment in which EP component 170 is software-implemented, although the anomaly detector is shown as a separate component of the computer system 100, EP component 170 can be stored on, e.g., the first storage device 122 and/or the second storage device 124. Alternatively, EP component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
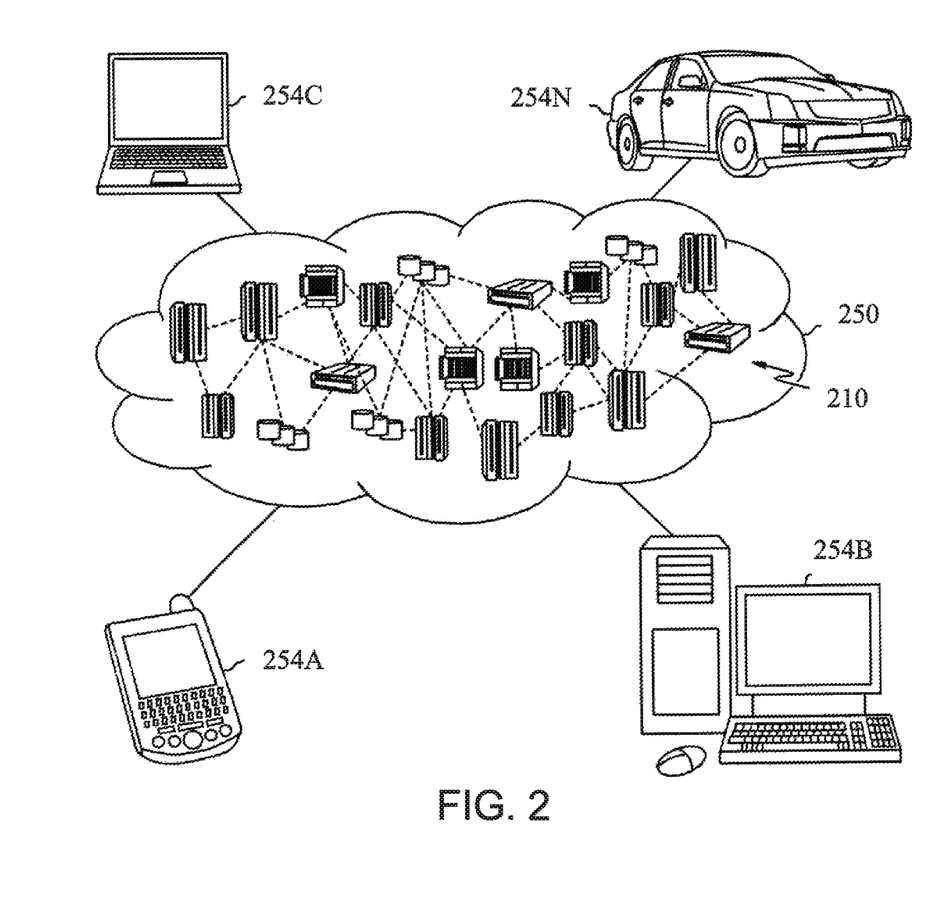
FIG. 2 is a block diagram showing an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
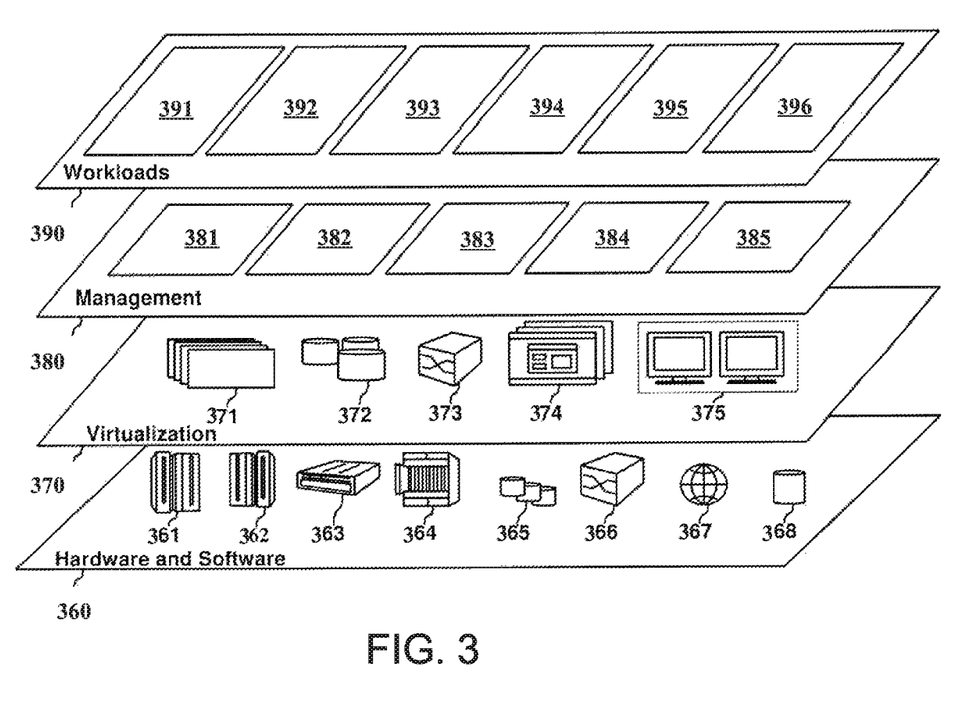
FIG. 3 is a block diagram showing a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and machine learning 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
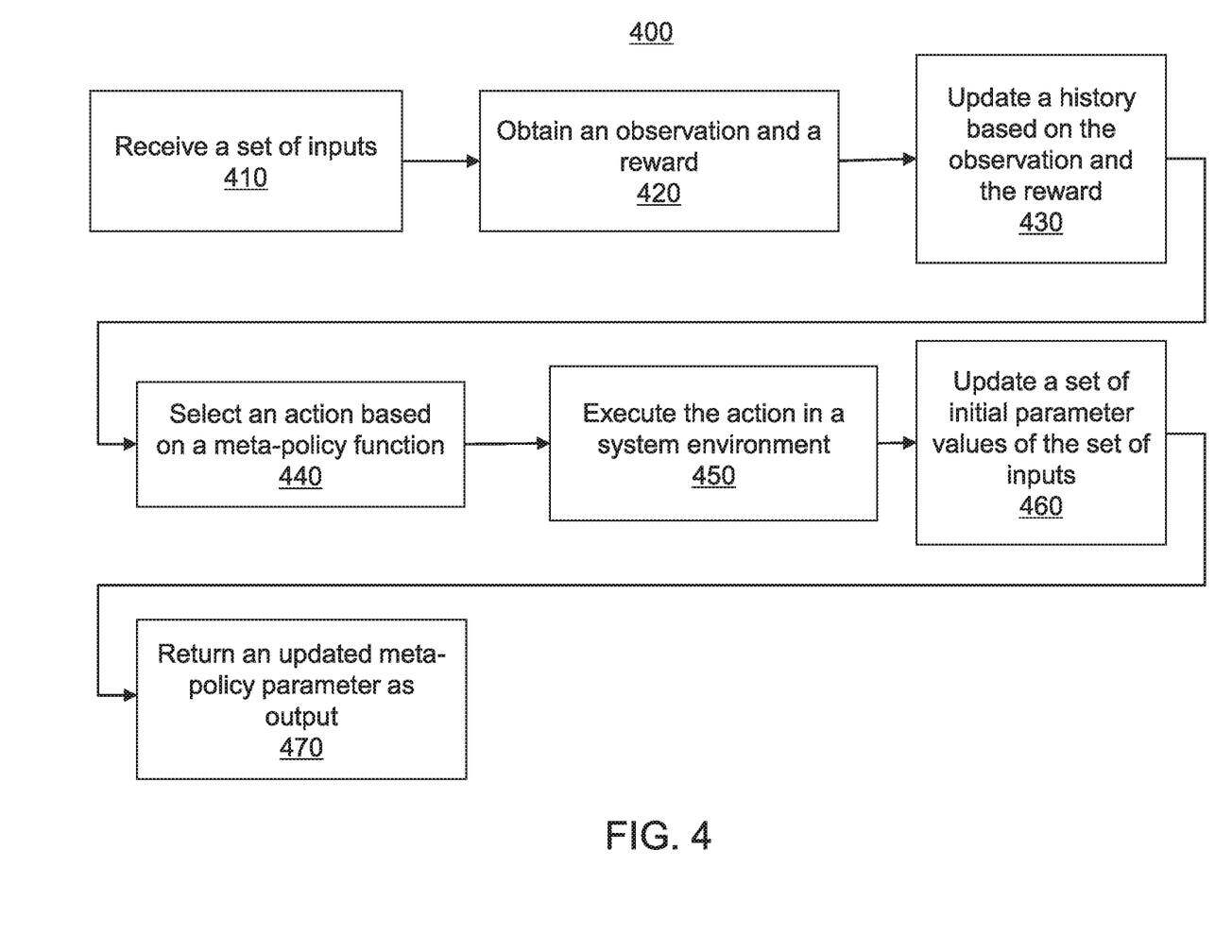
FIG. 4 is a block/flow diagram of a system/method for using predictive analytics to leverage ensemble policies for maximizing long-term returns, in accordance with an embodiment of the present invention.

With reference to FIG. 4, a block/flow diagram is provided illustrating a system/method 400 for implementing artificial intelligence agents to perform machine learning tasks using predictive analytics to leverage ensemble policies for maximizing long-term returns.

In this illustrative example, a sequential decision-making process is considered, where, at each timestep $t=\{0, 1, \ldots, T\}$, a controller or agent can observe (partial) information associated with a targeted system environment, select an action from a finite set of actions, and execute the selected action in the targeted system environment. For example, the information can include an observation of a set of observations ($o_t \in O$) and an immediate reward (or cost) $r_t \in R$, and can execute an action ($a_t \in A$).

Each policy in a set of ensemble policies can have an internal state that can be represented as a state vector having a fixed length. For example, the m-th policy in the set of M ensemble polices can be represented by $P^{(m)}$, where $m=1, \ldots, M$, the state vector corresponding to the m-th policy can be represented by $s_t^{(m)}$ and the fixed length of the state vector $s_t^{(m)}$ can be represented by D(m) (e.g., $s_t^{(m)} \in \mathbb{R}^{D(m)}$). The state vector $s_t^{(m)}$ can change over time and can be computed by a function of the experience or history $h_t=\{o_0, r_0, a_0, o_1, r_2, a_2, \ldots, o_{t-1}, r_{t-1}, a_{t-1}, o_t, r_t\} \in H_t$. That is, $f^{(m)}: H \to \mathbb{R}^{D(m)}$. Action selection of each policy $P^{(m)}$ can depend on its state vector $s_t^{(m)}$. For example, each policy $P^{(m)}$ can have an action-selection function of the state vector $s_t^{(m)}$, $\pi^{(m)}: \mathbb{R}^{D(m)} \to A$. Each policy can evaluate own each internal state with the evaluation function of the internal state, $V^{(m)}: \mathbb{R}^{D(m)} \to \mathbb{R}$. Here, we can denote $v_t^{(m)} = V^{(m)}(s_t^{(m)})$, where $v_t^{(m)}$ is referred to as the state value of the state value function $V^{(m)}$. The state value function refers to the expected return starting from a state, and following a policy. If the function is un-available, it can be set to zero for the all state vectors, i.e., $V^{(m)}(\bullet)=0$. Therefore, each policy can be defined herein as $P^{(m)} \equiv \{f^{(m)}, \pi^{(m)}, V^{(m)}\}$, and the meta-policy can select an action at each timestep t utilizing the set of ensemble policies $P^{(1)}, \ldots, P^{(M)}$.

As will be described in further detail below, the objective of the system/method 400 is to (locally) optimize the meta-policy in terms of the expected cumulative reward $E[\Sigma_\gamma^{k-1} r_k]$ or averaged reward $E[r]$ through interaction with the targeted system at each timestep $t=\{0, \ldots, T\}$, where $E[x]$ is the expectation of x, and $\gamma \in [0,1]$ is a user-defined discount rate. For example, an updated meta-policy parameter $\theta$ associated with a meta-policy function can be returned as output. Illustratively, the system/method 400 can be implemented based on GPOMDP.

With the foregoing setup in mind, at block 410, a set of inputs is received. The following is an exemplary list of initialized parameters or values that can be provided as a set of inputs into the system/method:

1. Set of ensemble policies: $P^{(1)}, \ldots, P^{(M)}$
2. State vectors: $s_t^{(m)}$
3. State values: $v_t^{(m)}$
4. Parameterized meta-policy: q
5. Initial meta-policy parameter: $\theta \in \mathbb{R}^D$ (e.g., $\theta=0$)
6. Initial sufficient statistics: $z \in \mathbb{R}^D$ (e.g., $z=0$)
7. Initial baseline: $b \in \mathbb{R}$ (e.g., $b=0$)
8. Statistics forgetting rate: $\beta \in [0,1]$
9. Baseline learning rate: $\alpha_b > 0$
10. Meta-policy parameter learning rate: $\alpha_\theta > 0$
11. Training length: $T \in \mathbb{N}$ At block 420, for each timestep, an observation ($o_t$) and a reward ($r_t$) in the system environment are obtained.

At block 430, a history is updated based on the observation and the reward. For example, the history at timestep t, $h_t$, can be defined iteratively as $h_t = \{h_{t-1}, a_{t-1}, o_t, r_t\}$, where $h_o = \{o_o, r_o\}$ and $a_{t-1}$ refers to the action performed at the previous timestep t-1.

At block 440, an action can be selected based on the meta-policy function. The meta-policy function is parameterized with the meta-policy function parameter $\theta$ so that, at each timestep, the following properties can hold: (1) the input can include the actions $a_t^{(m)}$, state vectors $s_t^{(m)}$, state values $v_t^{(m)}$ in all policies $P^{(m)}$, $m=1, \ldots, M$, (2) the meta-policy function can output probabilities for actions, and (3) the meta-policy function can be differentiable with respect to the parameter $\theta$. Property (2) means that the meta-policy is a stochastic policy, as opposed to a deterministic policy. The degree of dependency of each policy can be based on the state vector of each policy. The meta-policy can be initialized to select an action with a higher probability, which the policy with high state value selects.

Illustratively, the meta-policy function can be represented as $q(a|h_t, P^{(1)}, \ldots, P^{(m)}, \theta)$. If the initial meta-policy parameter $\theta=0$, then $a_t \sim q(a|h_t, P^{(1)}, \ldots, P^{(m)}, \theta)$, where $$q(a|h_t, P^{(1)}, \ldots P^{(m)}, \theta) \equiv$$

$$\frac{\sum_{m=1}^{M} I(a = a_t^{(m)}) \exp\left(\theta^{(m)T} s_t^{(m)} + \exp(\theta_0) v_t^{(m)}\right)}{\sum_{m=1}^{M} \exp\left(\theta^{(m)T} s_t^{(m)} + \exp(\theta_0) v_t^{(m)}\right)}, \text{ and}$$

$$\theta \equiv [\theta_0, \theta^{(1)T}, \ldots, \theta^{(M)T}]^T \in \mathbb{R}^{1+\Sigma_{m=1}^{M} D(m)}.$$

and

At block 450, the selected action can be executed in the system environment.

At block 460, the set of initial parameter values can be updated. For example, the baseline b, the sufficient statistics z and the meta-policy parameter $\theta$ can be updated. More specifically, b can be updated as:

$$b := b + \alpha_b(b - r_t),$$

z can be updated as:

$$z := \beta z + \frac{\partial}{\partial \theta} \ln q(a \mid h_t, P^{(1)}, \ldots, P^{(m)}, \theta),$$

and

θ can be updated as:

$$\theta := \theta + \alpha (r_t - b) z.$$

At block 470, the meta-policy parameter updated at block 460 can then be returned as an output. The output meta-policy parameter can be used to specify the meta-policy used for selecting a future action for execution within the system environment (from information associated with the set of ensemble policies to maximize the long-term return).

The system/method of FIG. 4 can be used to improve the ability of artificial intelligence agents (e.g., robots) to perform machine learning tasks (e.g., reinforcement learning tasks) within an environment based on a MDP-based framework (e.g., POMDP). For example, the system/method of FIG. 4 can leverage multiple artificial intelligence agents to maximize the long-term return or reward associated with the task by leveraging different existing policies based on the situation, if multiple policies are available. In addition, leveraging the different existing policies to select optimal policies can reduce storage resources and/or computational resources in performing the machine learning task, as compared to learning policies from scratch, since learning policies from scratch can require much more data.

For example, the embodiments described herein can be applied by an artificial intelligence agent to a create dialog engine based on a combination of a plurality of dialog engines. Illustratively, a dialog engine for young people and senior citizens can be combined to create a dialog engine for people having ages falling between the young people and the senior citizens. As another example, the embodiments described herein can be applied by an artificial intelligence agent to mingle auto-trading engines between a plurality of companies to build an effective auto-trading policy. In either of these examples, the embodiments described herein can reduce the storage resources and/or computational resources used by artificial intelligence agents in performing the tasks.

Having described preferred embodiments of systems and methods of using predictive analytics to leverage ensemble policies for maximizing long-term returns (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for implementing artificial intelligence agents to perform machine learning tasks using predictive analytics to leverage ensemble policies for maximizing long-term returns, comprising:
   an artificial intelligence agent;
   a memory device for storing program code; and
   at least one processor device operatively coupled to the memory device and configured to execute program code stored on the memory device to:
   obtain a set of inputs including a set of ensemble policies, a meta-policy parameter, and initial sufficient statistics;
   select an action for execution within the system environment using a meta-policy function determined based in part on the set of ensemble policies and the meta-policy parameter;
   cause the artificial intelligence agent to execute the selected action within the system environment;
   execute program code stored on the memory device to update the initial sufficient statistics based on the execution of the selected action; and
   update the meta-policy parameter and an initial baseline based on the execution of the selected action.

2. The system of claim 1, wherein each policy in the set of ensemble polices has an internal state that can be represented as a state vector having a fixed length.

3. The system of claim 1, wherein the set of inputs further includes state vectors, state value, the initial baseline, a statistics forgetting rate, a baseline learning rate, a meta-policy parameter learning rate, and a training length.

4. The system of claim 1, wherein the at least one processor device is further configured to execute program code stored on the memory device to:
   obtain an observation and reward in a system environment; and
   update a history based on the observation and the reward.

5. The system of claim 4, wherein the meta-policy function is further based on the updated history.

6. The system of claim 1, wherein the at least one processor device is further configured to execute program code stored on the memory device to return the updated meta-policy parameter as output for selecting a future action for execution within the system environment.

7. A computer-implemented method for implementing artificial intelligence agents to perform machine learning tasks using predictive analytics to leverage ensemble policies for maximizing long-term returns, comprising:
   obtaining a set of inputs including a set of ensemble policies, a meta-policy parameter, and initial sufficient statistics;
   selecting an action for execution within the system environment using a meta-policy function determined based in part on the set of ensemble policies and the meta-policy parameter;
   causing an artificial intelligence agent to execute the selected action within the system environment;
   execute program code stored on a memory device to update the initial sufficient statistics based on the execution of the selected action; and
   updating the meta-policy parameter and an initial baseline based on the execution of the selected action.

8. The method of claim 7, wherein each policy in the set of ensemble polices has an internal state that can be represented as a state vector having a fixed length.

9. The method of claim 7, wherein the set of inputs further includes state vectors, state value, the initial baseline, a statistics forgetting rate, a baseline learning rate, a meta-policy parameter learning rate, and a training length.

10. The method of claim 7, wherein the at least one processor device is further configured to execute program code stored on the memory device to:
    obtain an observation and reward in a system environment; and
    update a history based on the observation and the reward.

11. The method of claim 10, wherein the meta-policy function is further based on the updated history.

12. The method of claim 7, wherein the at least one processor device is further configured to execute program code stored on the memory device to return the updated meta-policy function as output for selecting a future action for execution within the system environment.

13. A computer program product comprising a non-transitory computer readable storage medium having program instructions embodied therewith, the program instructions executable by a computer to cause the computer to perform a method for implementing artificial intelligence agents to perform machine learning tasks using predictive analytics to leverage ensemble policies for maximizing long-term returns, the method performed by the computer comprising:
   obtaining a set of inputs including a set of ensemble policies, a meta-policy parameter, and initial sufficient statistics;
   selecting an action for execution within the system environment using a meta-policy function determined based in part on the set of ensemble policies and the meta-policy parameter;
   causing an artificial intelligence agent to execute the selected action within the system environment;
   execute program code stored on a memory device to update the initial sufficient statistics based on the execution of the selected action; and
   updating the meta-policy parameter and an initial baseline based on the execution of the selected action.

14. The computer program product of claim 13, wherein each policy in the set of ensemble polices has an internal state that can be represented as a state vector having a fixed length.

15. The computer program product of claim 13, wherein the set of inputs further includes state vectors, state value, the initial baseline, a statistics forgetting rate, a baseline learning rate, a meta-policy parameter learning rate, and a training length.

16. The computer program product of claim 13, wherein the at least one processor device is further configured to execute program code stored on the memory device to:
   obtain an observation and reward in a system environment; and
   update a history based on the observation and the reward;
   wherein the meta-policy parameter is further based on the updated history.

17. The computer program product of claim 13, wherein the at least one processor device is further configured to execute program code stored on the memory device to return the updated meta-policy parameter as output for selecting a future action for execution within the system environment.

* * * * *